(12) United States Patent
Kokubo et al.

(10) Patent No.: US 7,798,283 B2
(45) Date of Patent: Sep. 21, 2010

(54) DRIVING DEVICE FOR POWER STEERING (75) Inventors: Takashi Kokubo, Tokyo (JP); Yoshizo Watanabe, Tokyo (JP); Masataka Hayashi, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 480 days.

(21) Appl. No.: 12/022,491

(22) Filed: Jan. 30, 2008

(65) Prior Publication Data

US 2009/0188341 A1 Jul. 30, 2009

(51) Int. Cl.
*B62D 5/04* (2006.01)
(52) U.S. Cl. .......................................... 180/444; 464/97
(58) Field of Classification Search .............. 464/51, 464/86, 97; 180/444, 446
See application file for complete search history.

(56) References Cited

U.S. PATENT DOCUMENTS 1,649,119 A * 11/1927 Kjelsberg ................... 464/97
2,734,359 A * 2/1956 Mulheim et al. ............... 464/97
2006/0065472 A1* 3/2006 Ogawa et al. ................ 180/444
2007/0175696 A1 8/2007 Saito et al.

* cited by examiner

*Primary Examiner*—Greg Binda
(74) *Attorney, Agent, or Firm*—Rabin & Berdo, PC (57) ABSTRACT

A power steering driving device 100 includes an input shaft 6 provided with a serration 8 and connected to an input mechanism 3 linked to a steering handle 2, an output shaft 7 provided with a serration 10 and connected to an output mechanism 5 linked to a vehicle wheel 4, and a torsion bar 15 that connects the input shaft 6 and the output shaft 7 coaxially. The serration 8 of the input shaft 6 and the serration 10 of the output shaft 7 are formed such that a ratio between the respective numbers of teeth thereof is a decimal, and to specify a relative rotation position of the input shaft 6 and the output shaft 7 relative to the input mechanism 3 and the output mechanism 5, a tooth on the serration 8 of the input shaft 6 and a tooth on the serration 10 of the output shaft 7 having a relative position deviation angle about an identical central axis which is equal to or smaller than an allowable value are selected as reference teeth.

6 Claims, 6 Drawing Sheets

DRIVING DEVICE FOR POWER STEERING

TECHNICAL FIELD OF THE INVENTION

This invention relates to a driving device for a power steering in which a serration is provided on an input shaft and an output shaft.

DESCRIPTION OF RELATED ART

In a driving device for a power steering provided with a serration on the input shaft and output shaft, the input shaft is serration-coupled to an input mechanism linked to a steering handle, and the output shaft is serration-coupled to an output mechanism linked to a vehicle wheel. Thus, the relative positions of the input mechanism and output mechanism are determined via the power steering driving device, and a neutral position is specified.

In a known version of this type of power steering driving device, the number of teeth on the serrations of the input shaft and output shaft differs. Typically, the serration of the input shaft is formed with a larger number of teeth to reduce deviation of the steering handle upon connection to the input mechanism. On the other hand, the serration of the output shaft is formed with a smaller number of teeth since the output shaft requires strength to receive a large load from the vehicle wheel.

SUMMARY OF THE INVENTION

The input shaft and output shaft are connected via a torsion bar so as to define the relative positions thereof about an identical central axis. When the ratio between the numbers of teeth on the serrations of the input shaft and output shaft is a decimal and the input shaft and output shaft are connected by the torsion bar, the deviation angle between the teeth is small in certain angular positions about an identical central axis, while in other angular positions the deviation angle between the teeth is large.

When the power steering driving device is attached to the input mechanism and output mechanism using an angular position in which the deviation angle between the teeth is large as a reference, the relative positions of the input mechanism and output mechanism deviate by an amount corresponding to the deviation angle. In other words, the input mechanism and output mechanism deviate from the neutral position.

In a vehicle such as an all terrain vehicle, a bar handle is sometimes used as the steering handle. In a vehicle having a bar handle, the rotary angle of the steering handle is extremely small in comparison with a vehicle having a circular handle. Therefore, when the input mechanism and output mechanism deviate from the neutral position, the neutral position of the steering handle and the vehicle wheel is greatly affected.

This invention has been designed in consideration of the problem described above, and it is an object thereof to provide a driving device for a power steering with which deviation from a neutral position on a steering handle side and a vehicle wheel side can be reduced when an input shaft and an output shaft provided with a serration are connected to the steering handle side and the vehicle wheel side, respectively.

In order to achieve above object, this invention provides a driving device for a power steering. The driving device for a power steering comprises an input shaft provided with a serration and connected to an input mechanism linked to a steering handle via the serration, an output shaft provided with a serration and connected to an output mechanism linked to a vehicle wheel via the serration, and a torsion bar that connects the input shaft and the output shaft coaxially and restricts relative rotation between the input shaft and the output shaft about an identical central axis, wherein the serration of the input shaft and the serration of the output shaft are formed with a different number of teeth, and a ratio between the numbers of teeth is a decimal, and to specify a relative rotation position of the input shaft and the output shaft relative to the input mechanism and the output mechanism, a tooth on the serration of the input shaft and a tooth on the serration of the output shaft having a relative position deviation angle about an identical central axis which is equal to or smaller than an allowable value are selected as reference teeth.

PREFERRED EMBODIMENTS OF THE INVENTION

Figure 1:
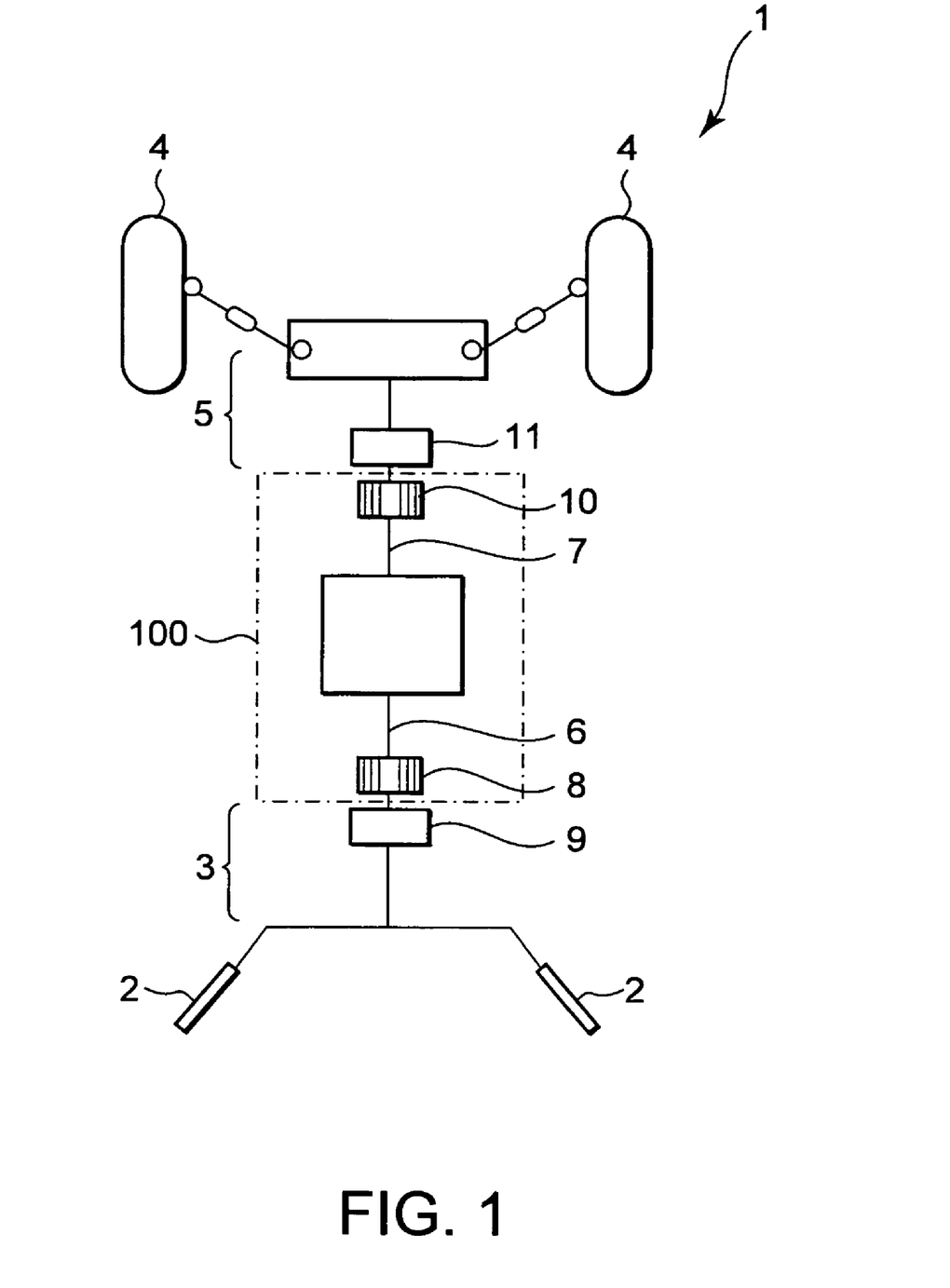
FIG. 1 is a schematic diagram of a vehicle installed with a power steering driving device according to an embodiment of this invention.

A power steering driving device 100 according to an embodiment of this invention is installed in an all terrain vehicle 1 such as a buggy or a snowmobile, shown in FIG. 1, and assists a steering operation performed by a driver.

As shown in FIG. 1, the all terrain vehicle 1 comprises an input mechanism 3 linked to a bar handle 2 serving as a steering handle, and an output mechanism 5 linked to a vehicle wheel 4.

The power steering driving device 100 comprises an input shaft 6 connected to the input mechanism 3 and an output shaft 7 connected to the output mechanism 5. Thus, the power steering driving device 100 is interposed between the input mechanism 3 and output mechanism 5 via the input shaft 6 and output shaft 7.

A male serration 8 is provided on the input shaft 6 and serration-coupled to a female serration 9 provided on the input mechanism 3. Further, a male serration 10 is provided on the output shaft 7 and serration-coupled to a female serration 11 provided on the output mechanism 5.

The male serration 8 of the input shaft 6 and the male serration 10 of the output shaft 7 are formed with a different number of teeth such that the male serration 8 of the input shaft 6 is formed with more teeth than the male serration 10 of the output shaft 7.

Figure 2:
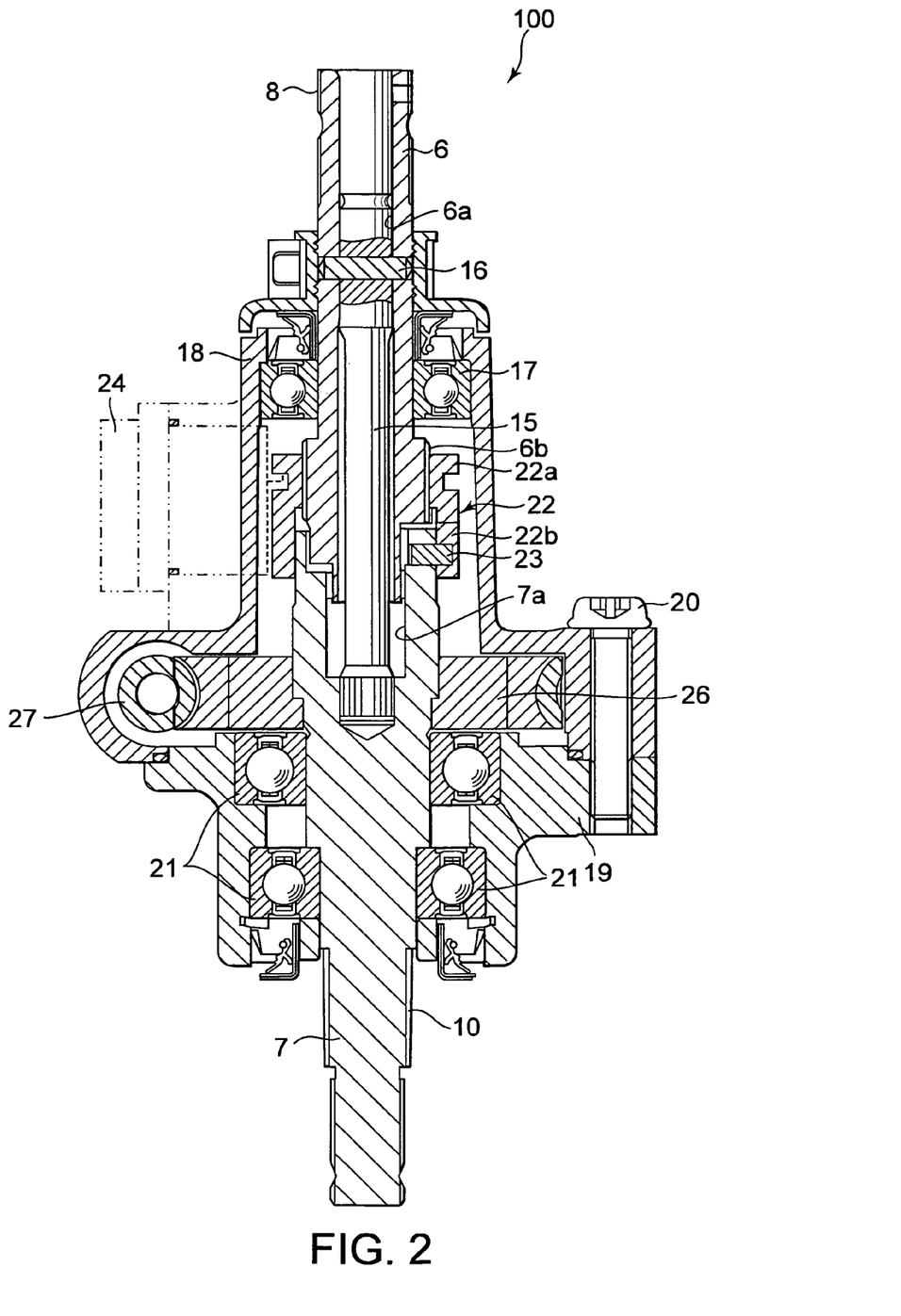
FIG. 2 is a sectional view of the power steering driving device according to an embodiment of this invention.

Next, referring to FIG. 2, the power steering driving device 100 will be described.

The input shaft 6 takes a cylindrical form, and a torsion bar 15 is inserted into a through-hole 6a in the input shaft 6. One end of the torsion bar 15 is connected to the input shaft 6 by a connecting pin 16.

The other end of the torsion bar 15 is inserted into a hollow portion 7a formed in an end portion of the output shaft 7 and serration-coupled to the output shaft 7.

Hence, the input shaft 6 and output shaft 7 are connected coaxially by the torsion bar 15 such that relative rotation thereof about an identical central axis is restricted.

The male serration 8 is provided on a tip end of the input shaft 6, and the male serration 10 is formed on a tip end of the output shaft 7. Hence, the relative positions of the teeth of the male serration 8 on the input shaft 6 and the teeth of the male serration 10 on the output shaft 7 about an identical central axis are defined by the torsion bar 15.

The input shaft 6 is supported rotatably on a housing 18 via a bearing 17, while the output shaft 7 is supported rotatably on a housing 19 via a bearing 21. The housing 18 and the housing 19 are coupled by a fastening member 20. Thus, the input shaft 6 and output shaft 7 integrated by the torsion bar 15 are supported rotatably on the housings 18, 19.

A cylindrical sleeve 22 is attached to the respective outer peripheries of the input shaft 6 and output shaft 7. One end 22a of the sleeve 22 is screwed to a helical gear 6b formed on the outer periphery of the input shaft 6. Further, a groove that engages a pin 23 provided on the outer periphery of the output shaft 7 is formed in an axial direction in another end 22b of the sleeve 22. Thus, when steering torque is applied to the input shaft 6 via the bar handle 2, causing the torsion bar 15 to undergo elastic torsion deformation such that the input shaft 6 and output shaft 7 rotate relative to each other about an identical central axis, the sleeve 22 moves in the axial direction along the pin 23.

The axial displacement of the sleeve 22 is detected by a torque sensor 24 attached to the housing 18, and steering torque is detected on the basis of displacement thereof.

A ring-shaped worm wheel 26 is pressed onto the outer periphery of the output shaft 7. A worm gear 27 coupled to an output shaft of an electric motor (not shown) meshes with the worm wheel 26.

The electric motor is driven on the basis of the detected torque detected by the torque sensor 24 such that an assisting force for supplementing a steering force applied to the bar handle 2 by a driver is applied to the output shaft 7 via the worm gear 27 and the worm wheel 26.

Next, the serrations of the input shaft 6 and output shaft 7 will be described in detail.

The male serration 8 of the input shaft 6 and the male serration 10 of the output shaft 7 are formed with a different number of teeth, and the relative positions of the teeth of the male serration 8 and the teeth of the male serration 10 about an identical central axis are defined by the torsion bar 15.

When the ratio between the numbers of teeth of the male serration 8 and the male serration 10 is an integer, a deviation angle, i.e. the difference between the relative positions of the corresponding teeth of the two serrations 8, 10 about an identical central axis, is identical in all angular positions about an identical central axis.

However, when the ratio between the numbers of teeth of the male serration 8 and the male serration 10 is a decimal, the deviation angle between corresponding teeth of the two serrations 8, 10 is small in certain angular positions about an identical central axis, while the deviation angle is large in other angular positions. In other words, the deviation angle between corresponding teeth differs according to the angular position about an identical central axis.

'The ratio between the numbers of teeth is a decimal' means that the result of dividing the larger number of teeth, from among the number of teeth of the male serration 8 and the number of teeth of the male serration 10, by the smaller number of teeth is not an integer but a decimal. Further, the corresponding teeth means the teeth having the closest relative positions of the male serration 8 and the male serration 10 about an identical central axis.

The ratio between the numbers of teeth of the male serration 8 and the male serration 10 will now be described using actual numerical values shown in Table 1 and Table 2 as an example. Table 1 and Table 2 show the angular position of each tooth of the two serrations 8, 10 and the deviation angles between the corresponding teeth of the two serrations 8, 10. Table 1 shows a case in which the ratio between the numbers of teeth of the two serrations 8, 10 is an integer, and Table 2 shows a case in which the ratio between the numbers of teeth of the two serrations 8, 10 is a decimal. It should be noted that in Tables 1 and 2, the relative angular positions about an identical central axis of one tooth from each serration 8, are matched, and these teeth are denoted respectively as tooth no. 0. Furthermore, in Tables 1 and 2, Z1 denotes the male serration 8 of the input shaft 6, and Z2 denotes the male serration 10 of the output shaft 7.

First, referring to Table 1, a case in which Z1 has 40 teeth at a pitch angle of 9 degrees and Z2 has 20 teeth at a pitch angle of 18 degrees, or in other words a case in which the ratio between the numbers of teeth of Z1 and Z2 is an integer (2=40/20), will be described.

As shown in Table 1, when the ratio between the numbers of teeth of Z1 and Z2 is an integer, the deviation angles between the corresponding teeth of Z1 and Z2 (for example, tooth no. 2 of Z1 and tooth no. 1 of Z2 or tooth no. 4 of Z1 and tooth no. 2 of Z2) are all 0 degrees. Further, when the deviation angle between tooth no. 0 of both Z1 and Z2 is 1 degree, the deviation angles between the corresponding teeth of Z1 and Z2 are all 1 degree. Hence, the deviation angle between the corresponding teeth of Z1 and Z2 is identical in all angular positions.

TABLE 1

| Z1: NUMBER OF TEETH 40 (PITCH ANGLE 9°), Z2: NUMBER OF TEETH 20 (PITCH ANGLE 18°) | | | | | | | | | | | | | | | | | |
|---|---|---|---|---|---|---|---|---|---|---|---|---|---|---|---|---|---|
| Z1 No. | 0 | 1 | 2 | 3 | 4 | 5 | 6 | 7 | 8 | 9 | 10 | 11 | 12 | ... | 38 | 39 | 40 |
| Z2 No. | 0 | — | 1 | — | 2 | — | 3 | — | 4 | — | 5 | — | 6 | — | 19 | — | 20 |
| Z1 position(degree) | 0 | 9 | 18 | 27 | 36 | 45 | 54 | 63 | 72 | 81 | 90 | 99 | 108 | ... | 342 | 351 | 360 |
| Z2 position(degree) | 0 | — | 18 | — | 36 | — | 54 | — | 72 | — | 90 | — | 108 | ... | 342 | — | 360 |
| DEVIATION ANGLE(degree | 0 | — | 0 | — | 0 | — | 0 | — | 0 | — | 0 | — | 0 | ... | 0 | — | 0 |

Figure 3:
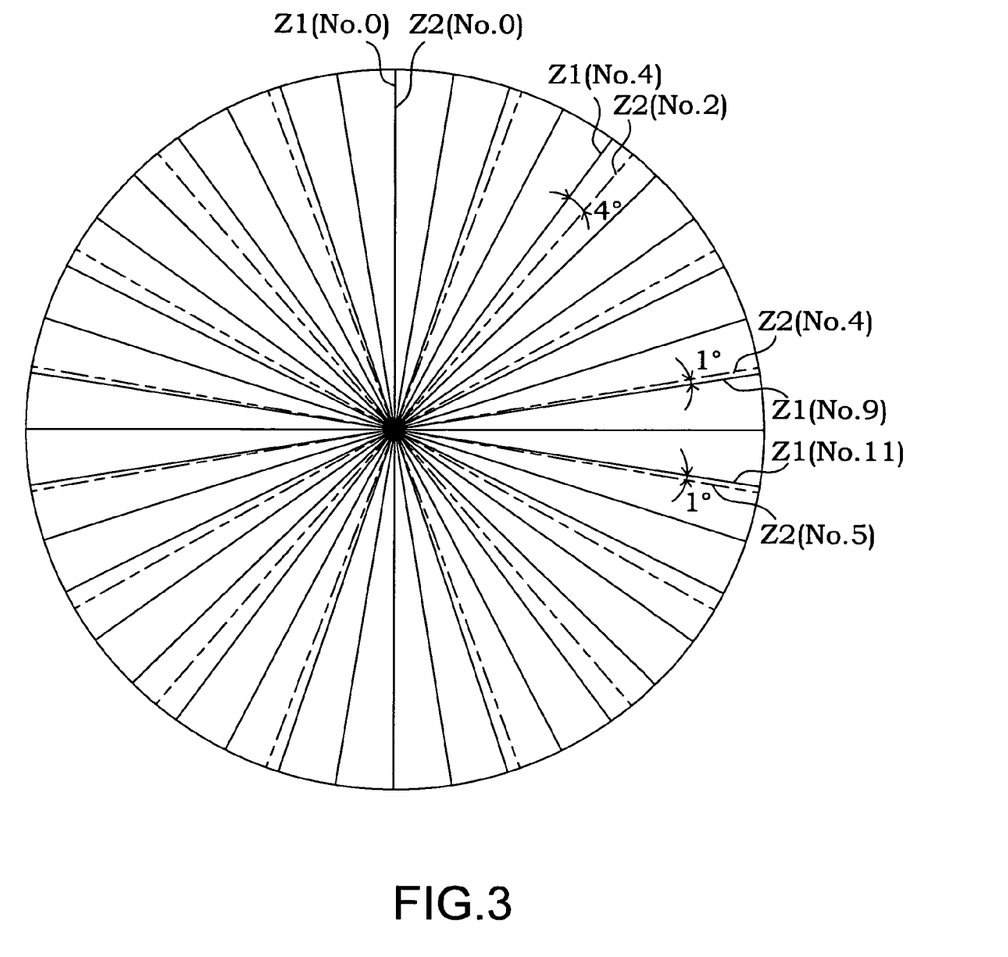
FIG. 3 shows center lines of teeth provided on Z1 and Z2, shown in Table 2, on an identical paper surface, wherein the solid lines indicate Z1 and the dot-dash lines indicate Z2.

Next, referring to Table 2 and FIG. 3, a case in which Z1 has 40 teeth at a pitch angle of 9 degrees and Z2 has 18 teeth at a pitch angle of 20 degrees, or in other words a case in which the ratio between the numbers of teeth of Z1 and Z2 is a decimal (2.2=40/18), will be described. FIG. 3 shows the center lines of the teeth of Z1 and Z2, shown in Table 2, on an identical paper surface, wherein the solid lines indicate the center lines of Z1 and the dot-dash lines indicate the center lines of Z2.

As shown in Table 2 and FIG. 3, when the ratio between the numbers of teeth of Z1 and Z2 is a decimal, the deviation angle between tooth no. 4 of Z1 and tooth no. 2 of Z2 is 4 degrees, whereas the deviation angle between tooth no. 9 of Z1 and tooth no. 4 of Z2 is 1 degree. Hence, the deviation angle between corresponding teeth of Z1 and Z2 differs according to the angular position.

Hereafter, the teeth of the male serration 8 and the male serration 10 that are connected to the valley portions of the female serration 9 and the female serration 11 in which the marking 31 is provided will be referred to as reference teeth. The relative rotation position of the input shaft 6 and output shaft 7 relative to the input mechanism 3 and output mechanism 5 is specified on the basis of the reference teeth.

TABLE 2

| Z1: NUMBER OF TEETH 40 (PITCH ANGLE 9°), Z2: NUMBER OF TEETH 18 (PITCH ANGLE 20°) | | | | | | | | | | | | | | | | | |
|---|---|---|---|---|---|---|---|---|---|---|---|---|---|---|---|---|---|
| Z1 No. | 0 | 1 | 2 | 3 | 4 | 5 | 6 | 7 | 8 | 9 | 10 | 11 | 12 | ... | 38 | 39 | 40 |
| Z2 No. | 0 | — | 1 | — | 2 | — | — | 3 | — | 4 | — | 5 | — | ... | 17 | — | 18 |
| Z1 position(degree) | 0 | 9 | 18 | 27 | 36 | 45 | 54 | 63 | 72 | 81 | 90 | 99 | 108 | ... | 342 | 351 | 360 |
| Z2 position(degree) | 0 | — | 20 | — | 40 | — | — | 60 | — | 80 | — | 100 | — | ... | 340 | — | 360 |
| DEVIATION ANGLE(degree | 0 | — | 2 | — | 4 | — | — | 3 | — | 1 | — | 1 | — | ... | 2 | — | 0 |

Figure 4:
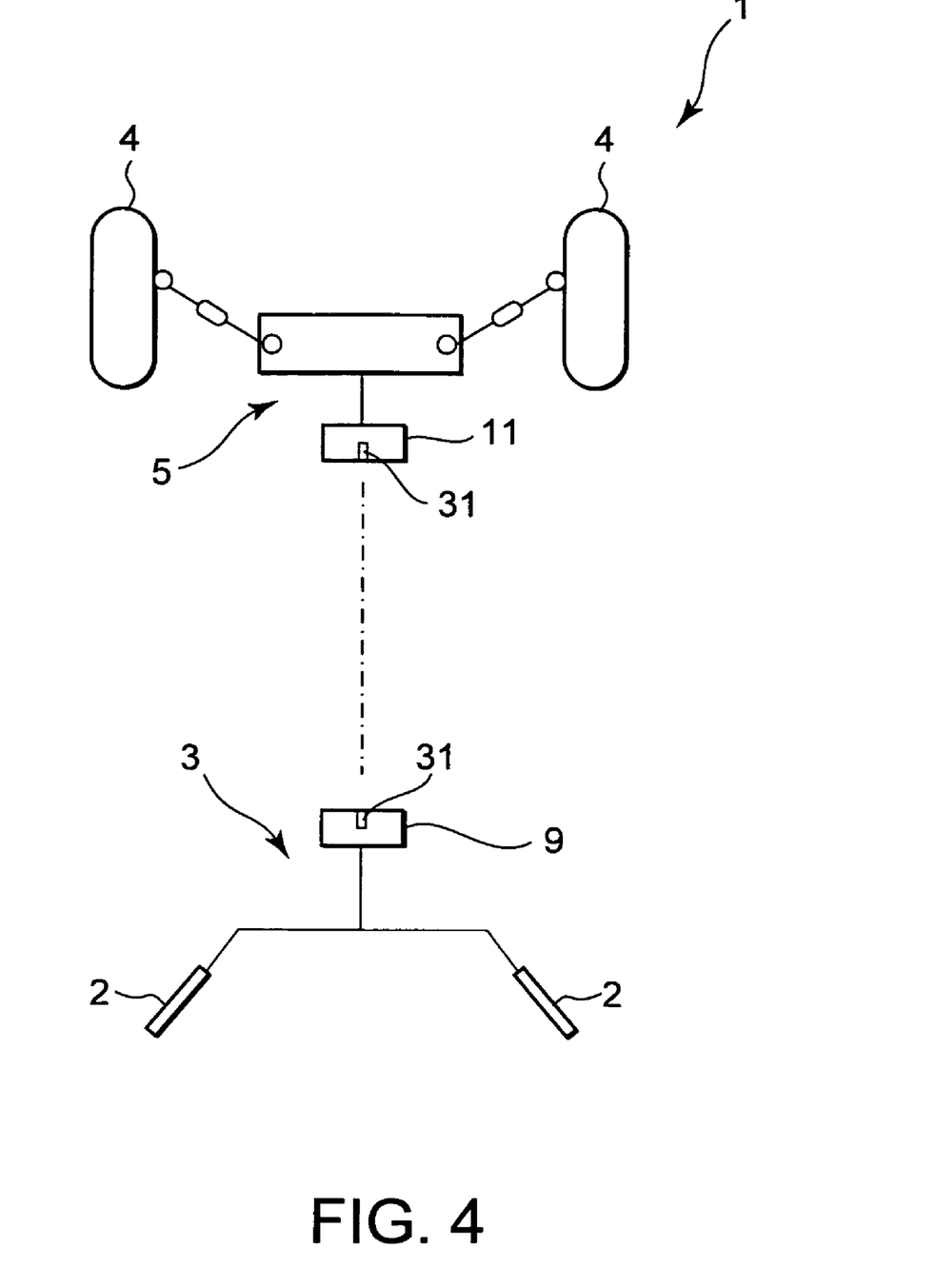
FIG. 4 is a view showing a state in which a bar handle and a vehicle wheel are respectively held in a neutral state.

Referring to FIG. 4, the female serration 9 of the input mechanism 3 and the female serration 11 of the output mechanism 5 will now be described. FIG. 4 is a view showing a state in which the bar handle 2 and the vehicle wheel 4 are each held in a neutral state.

The male serration 8 and the male serration 10, the relative positions of which are defined by the torsion bar 15, are connected respectively to the female serration 9 of the input mechanism 3 and the female serration 11 of the output mechanism 5.

The female serration 9 and the female serration 11 are formed in shapes that correspond respectively to the male serration 8 and the male serration 10, and a marking 31 is provided on one of a plurality of valley portions thereof. The valley portions provided with the marking 31 are reference valley portions of the female serration 9 and the female serration 11.

As shown in FIG. 4, when the bar handle 2 and the vehicle wheel 4 are respectively held in a neutral state, the female serration 9 and the female serration 11 are coupled respectively to the input mechanism 3 and output mechanism 5 such that the respective markings 31 have identical angular positions about an identical central axis. Thus, the neutral positions of the input mechanism 3 and output mechanism 5 are defined. It should be noted that in this embodiment, the marking 31 is formed by cutting a notch in the female serration 9 and the female serration 11, as shown in FIG. 4.

Hence, when the input mechanism 3 and output mechanism 5 are disposed in the neutral position such that the valley portions of the female serration 9 and the female serration 11 in which the marking 31 is formed are respectively connected to corresponding teeth of the male serration 8 and the male serration 10 that have a deviation angle of 0 degrees, the input mechanism 3 and output mechanism 5 maintain a neutral position. In other words, when the input shaft 6 and output shaft 7 are connected respectively to the input mechanism 3 and output mechanism 5 using corresponding teeth of the male serration 8 and the male serration 10 that have a deviation angle of 0 degrees as a reference, the bar handle 2 and the vehicle wheel 4 are set in a neutral state. Conversely, when the valley portions of the female serration 9 and the female serration 11 in which the marking 31 is formed are respectively connected to corresponding teeth of the male serration 8 and the male serration 10 that deviate by a predetermined angle, the input mechanism 3 and output mechanism 5 deviate from the neutral position by an amount corresponding to the predetermined angle. As a result, the bar handle 2 and vehicle wheel 4 deviate from the neutral state.

As described above, when the ratio between the numbers of teeth of the male serration 8 and the male serration 10 is an integer, the deviation angle of the corresponding teeth is identical in all angular positions about an identical central axis. Therefore, as long as corresponding teeth are set as the reference teeth, the deviation angle of the input mechanism 3 and output mechanism 5 from the neutral position is identical regardless of the corresponding teeth that are selected as the reference teeth.

In contrast, as described above, when the ratio between the numbers of teeth of the male serration 8 and the male serration 10 is a decimal, the deviation angle of the corresponding teeth differs according to the angular position about an identical central axis. Therefore, the deviation angle of the input mechanism 3 and output mechanism 5 from the neutral position differs according to the selected reference teeth.

Taking Table 2 and FIG. 3 as an example, when tooth no. 4 of Z1 and tooth no. 2 of Z2 are selected as the reference teeth, tooth no. 4 of Z1 is connected to the valley portion of the female serration 9 in which the marking 31 is provided, and tooth no. 2 of Z2 is connected to the valley portion of the female serration 11 in which the marking 31 is provided. As a result, the input mechanism 3 and output mechanism 5 defined in the neutral position deviate from the neutral position by 4 degrees.

In contrast, when tooth no. 9 of Z1 and tooth no. 4 of Z2 are selected as the reference teeth, tooth no. 9 of Z1 is connected to the valley portion of the female serration 9 in which the marking 31 is provided, and tooth no. 4 of Z2 is connected to the valley portion of the female serration 11 in which the marking 31 is provided. As a result, the input mechanism 3 and output mechanism 5 defined in the neutral position deviate from the neutral position by 1 degree.

Hence, when the ratio of the numbers of teeth of the male serration 8 and the male serration 10 is a decimal, the deviation angle of the input mechanism 3 and output mechanism 5 from the neutral position increases according to the selected reference teeth, and as a result, the bar handle 2 and the vehicle wheel 4 may deviate from the neutral state by an amount that exceeds an allowable limit. In other words, the deviation of the bar handle 2 and vehicle wheel 4 from the neutral state is determined according to the relative rotation position of the input shaft 6 and output shaft 7 relative to the input mechanism 3 and output mechanism 5.

Therefore, when the ratio between the numbers of teeth of the male serration 8 and the male serration 10 is a decimal, reference teeth having a deviation angle which is no greater than an allowable value must be selected to ensure that the deviation of the bar handle 2 and vehicle wheel 4 from the neutral state does not exceed the allowable limit, and the relative rotation position of the input shaft 6 and output shaft 7 relative to the input mechanism 3 and output mechanism 5 must be specified on the basis of these reference teeth.

Next, the allowable value of the reference teeth will be described.

An upper limit value of the deviation angle between corresponding teeth of the male serration 8 and the male serration 10 may be calculated on the basis of the number of teeth of the male serration 8 and the male serration 10. A method of calculating this upper limit value will now be described using the serrations shown in Table 2 as an example.

First, the deviation angles between the corresponding teeth of Z1 and Z2, or in other words the differences between multiple values of the pitch angle of Z1 and multiple values of the pitch angle of Z2, are calculated to the least common multiple. Then, a minimum value of the deviation angles between the corresponding teeth, or in other words a minimum value of the differences between the multiple values of the two pitch angles, is calculated. ½ of this minimum value serves as the upper limit value.

More specifically, the pitch angle of Z1 is 9 degrees, and the pitch angle of Z2 is 20 degrees, and therefore the least common multiple of the two is 180. Multiple values of 9 are 9, 18, 27, 36, 45, 54, 63, 72, 81, 90, 99, 108, 117, 126, 135, 144, 153, 162, 171 and 180. Multiple values of 20 are 20, 40, 60, 80, 100, 120, 140, 160 and 180. The minimum value of the difference between these multiple values up to the least common multiple 180 is 1, i.e. the difference between 81 and 80 and the difference between 99 and 100. ½ of this minimum value, i.e. 0.5 degrees, is set as the upper limit value of the deviation angle between the corresponding teeth of Z1 and Z2. In other words, when a serration having 40 teeth and a serration having 18 teeth are connected by the torsion bar 15, corresponding teeth having a deviation angle of 0.5 degrees or less about an identical central axis invariably exist.

Figure 5A:
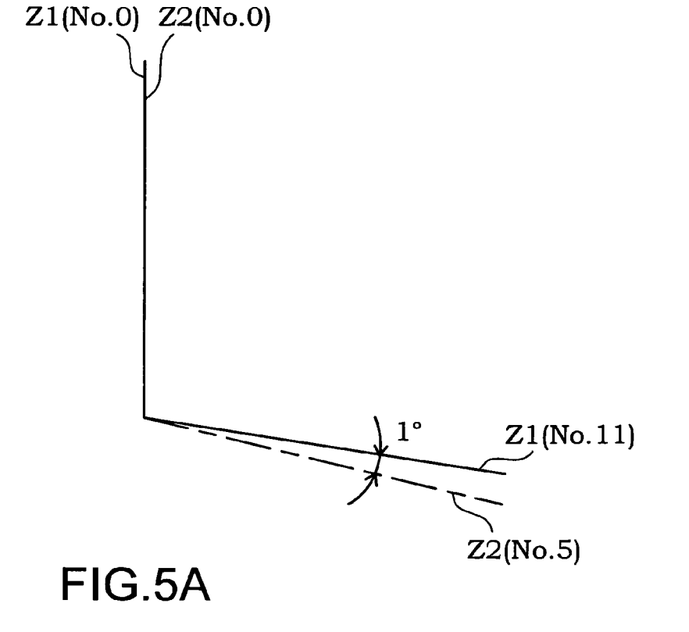
FIGS. 5A and 5B show center lines of a tooth no. 0 and a tooth no. 11 provided on Z1 and a tooth no. 0 and a tooth no. 5 provided on Z2, shown in Table 2, on an identical paper surface.
Figure 5B:
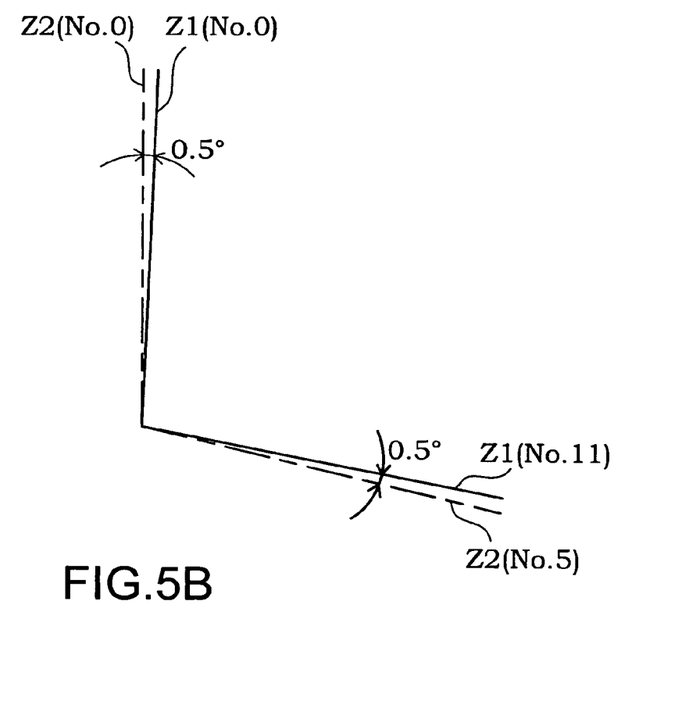

This will now be described in further detail with reference to FIG. 5. FIG. 5 shows the center lines of a tooth no. 0 and a tooth no. 11 of Z1 and a tooth no. 0 and a tooth no. 5 of Z2, shown in Table 2, on an identical paper surface, wherein the solid lines indicate the center lines of Z1 and the dot-dash lines indicate the center lines of Z2.

FIG. 5A shows a case in which the deviation angle between tooth no. 0 of Z1 and tooth no. 0 of Z2 is 0 degrees, and in this case, as shown in Table 2, the deviation angle between tooth no. 11 of Z1 and tooth no. 5 of Z2 is 1 degree.

When the relative angular positions of Z1 and Z2 about an identical central axis deviate from the state shown in FIG. 5A, or more specifically when tooth no. 0 of Z1 rotates (deviates) clockwise in FIG. 5A, the deviation angle between tooth no. 0 of Z1 and tooth no. 0 of Z2 increases from 0 degrees, whereas the deviation angle between tooth no. 11 of Z1 and tooth no. 5 of Z2 decreases from 1 degree. As shown in FIG. 5B, when the deviation angle between tooth no. 0 of Z1 and tooth no. 0 of Z2 reaches 0.5 degrees, the deviation angle between tooth no. 11 of Z1 and tooth no. 5 of Z2 also becomes 0.5 degrees. When the deviation angle between tooth no. 0 of Z1 and tooth no. 0 of Z2 exceeds 0.5 degrees, the deviation angle between tooth no. 11 of Z1 and tooth no. 5 of Z2 falls below 0.5 degrees. Therefore, the upper limit value of the deviation angle between the corresponding teeth of Z1 and Z2 is 0.5 degrees.

As described above, the upper limit value of the deviation angle between the corresponding teeth of Z1 and Z2 may be calculated as ½ the minimum difference between the multiple values of the pitch angles of Z1 and Z2 up to the least common multiple. In other words, the upper limit value of the deviation angle between the corresponding teeth of Z1 and Z2 can be set by adjusting the number of teeth of Z1 and Z2.

Therefore, first, an allowable value of the deviation angle between the corresponding teeth of the male serration 8 and the male serration 10 is preset such that the deviation of the bar handle 2 and vehicle wheel 4 from the neutral state remains within the allowable limit. The number of teeth of the male serration 8 and the male serration 10 is then determined such that the upper limit value of the deviation angle between the corresponding teeth of the male serration 8 and the male serration 10 is no greater than the set allowable value.

When the number of teeth is determined in this manner, corresponding teeth having a deviation angle about an identical central axis that is equal to or smaller than the allowable value invariably exist in the male serration 8 and the male serration 10. Hence, by selecting corresponding teeth having a deviation angle which is equal to or smaller than the allowable value as the reference teeth and specifying the relative rotation position of the input shaft 6 and output shaft 7 relative to the input mechanism 3 and output mechanism 5 on the basis of the reference teeth, the deviation of the bar handle 2 and vehicle wheel 4 from the neutral state can be kept within the allowable limit.

In the case described above, the upper limit value of the deviation angle between the corresponding teeth of the male serration 8 and the male serration 10 is calculated as ½ the minimum difference between the multiple values of the pitch angles of the male serration 8 and the male serration 10 up to the least common multiple.

In another method, the upper limit value of the deviation angle between the corresponding teeth of the male serration 8 and the male serration 10 may be calculated as ½ the greatest common divisor of the pitch angles of the male serration 8 and the male serration 10. To describe this with reference to Table 2, the pitch angle of Z1 is 9 degrees, the pitch angle of Z2 is 20 degrees, and the greatest common divisor of the two is 1. Therefore, ½ the greatest common divisor, i.e. 0.5 degrees, serves as the upper limit value of the deviation angle between the corresponding teeth of Z1 and Z2. Hence, the upper limit value of the deviation angle between the corresponding teeth of Z1 and Z2 is 0.5 degrees, regardless of the employed calculation method.

It should be noted that the method described above, which employs the greatest common divisor, cannot be used when at least one of the pitch angles of the male serration 8 and the male serration 10 is a decimal. Therefore, in such a case, the method employing the least common multiple, described previously, is used.

Next, a method of connecting the input shaft 6 and output shaft 7 to the input mechanism 3 and output mechanism 5 will be described.

First, the allowable value of the deviation angle between the corresponding teeth of the male serration 8 and the male serration 10 is set by design or trial and error such that the deviation of the bar handle 2 and vehicle wheel 4 from the neutral state remains within the allowable limit. It is assumed here that the allowable value is set at 1 degree.

Next, the number of teeth of the male serration 8 and the male serration 10 is determined such that the upper limit value of the deviation angle between the corresponding teeth of the male serration 8 and the male serration 10 is equal to or smaller than the set allowable value. Here, the allowable value is 1 degree, and therefore it is assumed that the numbers of teeth of the male serration 8 and the male serration 10 are set at 40 and 18, respectively, to provide an upper limit value of 0.5.

Next, the input shaft 6 and output shaft 7 are connected by the torsion bar 15, whereby the relative positions of the teeth of the male serration 8 and the teeth of the male serration 10 about an identical central axis are defined.

Next, an arbitrary single tooth is specified from the male serration 8 and the male serration 10, for example from among the 40 teeth of the male serration 8.

Next, the tooth that corresponds to the specified tooth of the male serration 8 is specified from among the 18 teeth of the other male serration 10. The deviation angle, or in other words the relative position difference about an identical central axis, between the specified teeth of the male serration 8 and the male serration 10 is then measured.

Here, a set regularity corresponding to the numbers of teeth of the male serration 8 and the male serration 10 exists in the deviation angle between the corresponding teeth of the two serrations 8, 10. Accordingly, corresponding teeth having a deviation angle which is equal to or smaller than the upper limit value of 0.5 degrees are selected on the basis of the measured deviation angle and the deviation angle regularity. Hence, there is no need to measure the deviation angles between all of the corresponding teeth of the male serration 8 and the male serration 10, and as long as the deviation angle between any single set of corresponding teeth is measured, corresponding teeth having a deviation angle which is equal to or smaller than the upper limit value can be selected on the basis of the measured deviation angle. It should be noted that when plural sets of corresponding teeth having a deviation angle which is equal to or smaller than the upper limit value exist, the corresponding teeth that have the smallest deviation angle are selected therefrom. The selected corresponding teeth are then set as the reference teeth.

Figure 6:
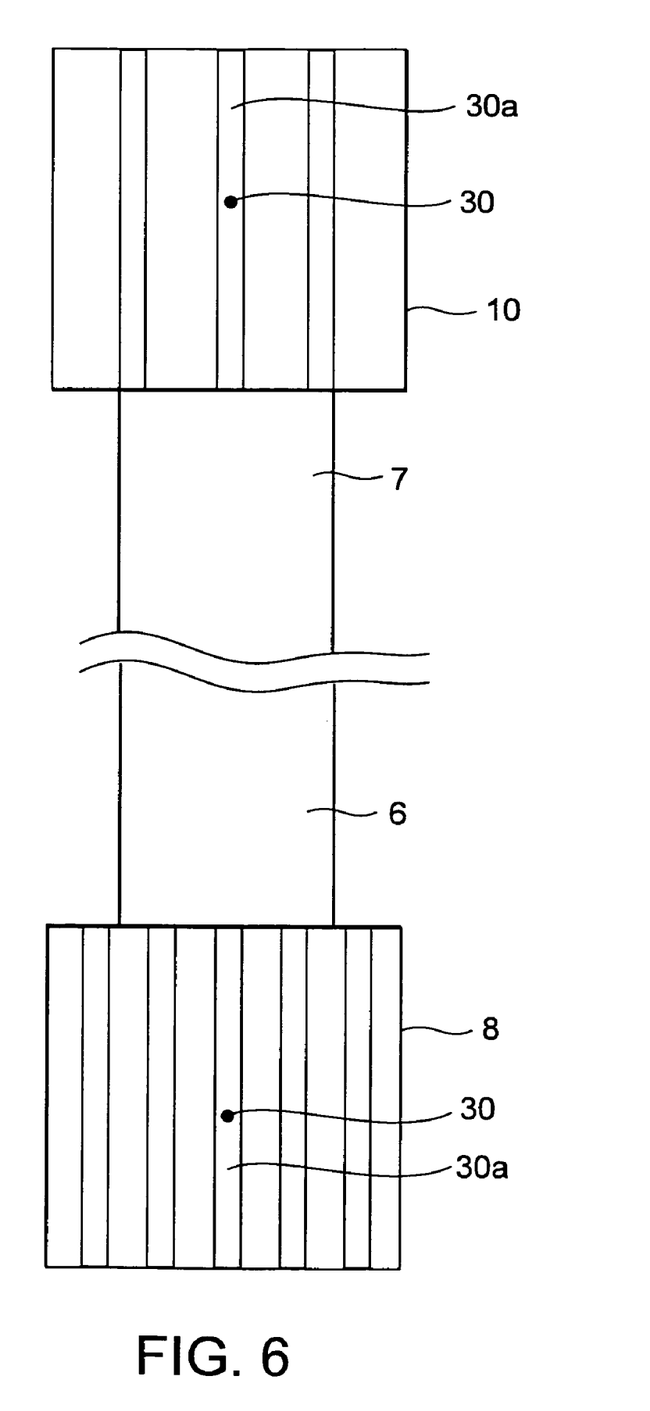
FIG. 6 is an enlarged view of serrations provided on an input shaft and an output shaft.

Next, as shown in FIG. 6, a marking 30 is formed on respective selected reference teeth 30a of the male serration 8 and the male serration 10. It should be noted that the marking 30 need not be applied directly to the reference teeth 30a, and may be applied to positions corresponding to the reference teeth 30a. Alternatively, the marking 30 may be applied to only one of the reference teeth 30a of the male serration 8 and the male serration 10.

The operations to select the reference teeth and apply the marking 30 are performed through automatic control by a controller. Alternatively, the reference teeth may be selected by measuring the deviation angles between all of the corresponding teeth of the male serration 8 and the male serration 10.

Next, the male serration 8 and the female serration 9 are connected such that the reference tooth of the male serration 8 formed with the marking 30 matches the valley portion of the female serration 9 formed with the marking 31. Further, the male serration 10 and the female serration 11 are connected such that the reference tooth of the male serration 10 formed with the marking 30 matches the valley portion of the female serration 11 formed with the marking 31.

Hence, the input shaft 6 and output shaft 7 are connected to the input mechanism 3 and output mechanism 5, and the input mechanism 3 and output mechanism 5 are connected via the power steering driving device 100.

Here, the connection between the input shaft 6 and the output shaft 7 causes the input mechanism 3 and output mechanism 5 defined in the neutral position to deviate from the neutral position by an amount corresponding to the deviation angle between the reference teeth 30a of the male serration 8 and the male serration 10. However, since the deviation angle between the reference teeth 30a of the male serration 8 and the male serration 10 is equal to or smaller than the upper limit value of 0.5 degrees and the allowable value of 1 degree, the deviation of the bar handle 2 and the vehicle wheel 4 from the neutral state remains within the allowable limit such that the effect thereof is small.

The embodiment described above exhibits the following effects.

When the ratio between the numbers of teeth of the male serration 8 and the male serration 10 is a decimal, the deviation of the bar handle 2 and vehicle wheel 4 from the neutral state differs according to the relative rotation position of the input shaft 6 and output shaft 7 relative to the input mechanism 3 and output mechanism 5. However, the relative rotation position of the input shaft 6 and output shaft 7 relative to the input mechanism 3 and output mechanism 5 is specified on the basis of the reference teeth, which are constituted by a tooth of the male serration 8 on the input shaft 6 and a tooth of the male serration 10 on the output shaft 7 having a relative position deviation angle about an identical central axis which is equal to or smaller than a preset allowable value, and therefore the deviation of the bar handle 2 and vehicle wheel 4 from the neutral state can be kept within the allowable limit.

Further, the numbers of teeth of the male serration 8 and the male serration 10 are set such that the upper limit value of the deviation angle between the corresponding teeth of the two is equal to or smaller than the allowable value, and corresponding teeth having a deviation angle which is equal to or smaller than the upper limit value are selected as the reference teeth. Hence, the deviation of the bar handle 2 and vehicle wheel 4 from the neutral state can be kept within the allowable limit.

Further, the male serrations 8, 10 and female serrations 9, 11 are connected such that the reference teeth of the male serrations 8, 10 provided with the marking 30 match the valley portions of the female serrations 9, 11 provided with the marking 31. By connecting the male serrations 8, 10 to the female serrations 9, 11 on the basis of the reference teeth provided with the marking 30, these connections can be formed easily. Hence, even when the assembly location of the power steering driving device 100, the location in which the input shaft 6 of the power steering driving device 100 is connected to the input mechanism 3, and the location in which the output shaft 7 of the power steering driving device 100 is connected to the output mechanism 5 are different, the power steering driving device 100 can be attached to the input mechanism 3 and output mechanism 5 while keeping the deviation of the bar handle 2 and vehicle wheel 4 from the neutral state within the range of the allowable limit.

Other embodiments will now be described.

In the above embodiment, the female serration 9 and the female serration 11 are coupled to the input mechanism 3 and the output mechanism 5, respectively, such that the markings 31 on the valley portions are formed in identical angular positions about an identical central axis.

However, the female serration 9 and the female serration 11 may be coupled to the input mechanism 3 and the output mechanism 5, respectively, while holding the bar handle 2 and the vehicle wheel 4 in the neutral state and allowing the markings 31 formed on the valley portions to deviate by a predetermined angle ($\alpha°$) about an identical central axis.

In this case, corresponding teeth having a deviation angle which is equal to or smaller than the upper limit value when the male serration 8 and the male serration 10 undergo relative rotation by the predetermined angle ($\alpha°$) are selected as the reference teeth of the male serration 8 and the male serration 10. In other words, the positions of the reference tooth of the male serration 8 and, the reference tooth of the male serration 10 deviate by an amount corresponding to $\alpha°$+the deviation angle of the corresponding teeth.

Further, in the above embodiment, a male serration is provided on the input shaft 6 and output shaft 7, while a female serration is provided on the input mechanism 3 and output mechanism 5. However, a female serration may be provided on the input shaft 6 and output shaft 7, and a male serration may be provided on the input mechanism 3 and output mechanism 5. Further, a male serration may be provided on one of the input shaft 6 and output shaft 7, and a female serration may be provided on the other.

This invention is not limited to the embodiments described above, and may be subjected to various modifications within the scope of the technical spirit thereof.

What is claimed is:

1. A driving device for a power steering, comprising:
   an input shaft provided with a serration and connected to an input mechanism linked to a steering handle via the serration;
   an output shaft provided with a serration and connected to an output mechanism linked to a vehicle wheel via the serration; and
   a torsion bar that connects the input shaft and the output shaft coaxially and restricts relative rotation between the input shaft and the output shaft about an identical central axis,
   wherein the serration of the input shaft and the serration of the output shaft are formed with a different number of teeth, and a ratio between the numbers of teeth is a decimal, and
   to specify a relative rotation position of the input shaft and the output shaft relative to the input mechanism and the output mechanism, a tooth on the serration of the input shaft and a tooth on the serration of the output shaft having a relative position deviation angle about an identical central axis which is equal to or smaller than an allowable value are selected as reference teeth.

2. The driving device for a power steering as defined in claim 1, wherein the reference teeth are respectively connected to valley portions of the input mechanism and the output mechanism in a state where the input mechanism and the output mechanism are disposed in the neutral position.

3. The driving device for a power steering as defined in claim 1, wherein the numbers of teeth on the serrations of the input shaft and the output shaft are set such that a calculated value, which is calculated as ½ a minimum difference between multiple values of pitch angles of the serration on the input shaft and the serration on the output shaft up to a least common multiple, is equal to or lower than the allowable value, and
   the teeth having the relative position deviation angle about an identical central axis which is equal to or smaller than the calculated value are selected as the reference teeth.

4. The driving device for a power steering as defined in claim 1, wherein the numbers of teeth on the serrations of the input shaft and the output shaft are set such that a calculated value, which is calculated as ½ a greatest common divisor of pitch angles of the serration on the input shaft and the serration on the output shaft, is equal to or lower than the allowable value, and
   the teeth having the relative position deviation angle about an identical central axis which is equal to or smaller than the calculated value are selected as the reference teeth.

5. The driving device for a power steering as defined in claim 1, wherein a marking is formed on the reference tooth of at least one of the serration on the input shaft and the serration on the output shaft or in a position corresponding to the reference tooth.

6. The driving device for a power steering as defined in claim 1, wherein the steering handle is a bar handle.

* * * * *